United States Patent Office 3,402,155
Patented Sept. 17, 1968

3,402,155
STORABLE, ONE-PART POLYTHIOL COMPOSITIONS WITH AMINE-LOADED MOLECULAR SIEVES
Edward F. Kutch, Trenton, N.J., assignor to Thiokol Chemical Corporation, Bristol, Pa., a corporation of Delaware
No Drawing. Filed Aug. 22, 1966, Ser. No. 573,827
13 Claims. (Cl. 260—79)

ABSTRACT OF THE DISCLOSURE

One-part polymer compositions containing (a) a curable, liquid polythiol polymer, (b) a dormant curing agent, (c) a hygroscopic accelerating agent, and (d) an amine-loaded molecular sieve are characterized by excellent storage stability and undergo relatively fast cures when exposed to moisture or a moisture-laden atmosphere. Upon exposure of these one-part polymer compositions to moisture or a moisture-laden atmosphere, the hygroscopic accelerating agent facilitates the absorption of water by the polymer composition which, in turn, displaces amine from the amine-loaded molecular sieve, thereby accelerating the rate of cure of the polymer composition.

---

This invention relates to an improved one-part, stable, curable composition comprising (—SH) group containing liquid polymer (hereinafter called polythiol polymer). More particularly, this invention relates to an improved one-part, stable, curable polythiol polymer based composition which has incorporated therein (1) a hygroscopic accelerating agent and (2) a zeolitic molecular sieve loaded with a basic compound.

Liquid polythiol polymers such as disclosed, for example, in U.S. Patents 2,230,390, 2,436,137, 3,243,411, 2,466,963 and 2,789,958 have found a wide variety of applications because of the properties of the cured polymers. These polymers have found extensive use for sealants, caulking compounds, adhesives, and the like. Because of the nature of the curing agents for such polymers, for a long period of time it was not possible to compound polythiol polymer compositions into air-curable one-part, storage stable, commercially acceptable products. It was therefore necessary to compound the composition immediately prior to use, or to package the ingredients in two parts, one containing the polythiol polymer and the other containing the curing agent. However, a number of moisture activated one-part polythiol polymer compositions have now been developed as is shown in U.S. 3,225,017, and in copending U.S. applications Ser. No. 138,123 filed Sept. 14, 1961, now abandoned and Ser. No. 310,925 filed Sept. 23, 1963, now abandoned. These one-part moisture activated compositions, however, have the disadvantage of having relatively short storage stability and/or long cure time. "Storage stability," refers to the quality of a composition when stored in moisture and air-tight containers after compounding and prior to use of remaining fluid and thereby retaining its utility as an adhesive, caulking compound and the like. "Cure time" refers to the length of time required for a curable composition freshly applied to a substrate to "cure up" or to take on a hardened or an elastomeric nature throughout the composition.

"Short package stability" (e.g. a few days) often leads to inconvenience, added expense and waste due to the necessity of compounding the ingredients of a composition having such stability characteristics shortly before application. On the other hand, "long cure time" (e.g. a month or more) can likewise lead to inconvenience, expense and waste due to work delays, weakened adhesive bond or even bond failure due to external influences (e.g. movement) upon the uncured adhesive bond. This need for curable, one-package sealant, etc. compositions having good package stability and relatively short cure times becomes particularly critical in such assembly line operations as automobile production and production of prefab housing components. Up to the time of this invention efforts to obtain a one-package polythiol polymer based composition having both "long package stability" and "short cure time" have met in failure. When the package stability was lengthened, then the cure time was detrimentally increased. On the other hand, when the cure time was shortened, then the package stability was detrimentally shortened.

It is therefore an object of this invention to provide a one-part polythiol polymer based composition which is both storage stable for a relatively long period of time and which has a relatively short cure time upon application.

It is another object of this invention to provide such compositions in completely pre-mixed form and suitably packaged in a single container in order that after a relatively long period of storage the composition may be directly deposited in place without the need of power mixers, stirrers, or the like; and wherein such compositions will rapidly cure-up upon application to the cure site.

It is still a further object of this invention to provide such one-part compositions which may be stored for a prolonged period of time in a liquid phase and may be rapidly cured in place to a tough elastomeric composition merely by application to the desired site and exposure to the atmosphere.

These and other objects, which will be apparent from the disclosure, are accomplished by means of a one-part, curable, stable, hygroscopic liquid polymer composition comprising a liquid polythiol polymer. The curable polymer composition is activated by the presence of moisture and base. The polymer composition has incorporated therein (1) a zeolitic molecular sieve loaded with a basic compound which basic compound will be displaced from the molecular sieve in a moisture containing environment, and wherein the basic compound is an accelerator for the cure of the composition, and (2) a non-molecular sieve hygroscopic accelerating agent. The polymer composition when exposed to moisture or moisture containing atmosphere, or other moisture containing gaseous vapor which does not adversely interfere with the cure of the polymer composition, picks up moisture due to the hygroscopic nature of the molecular sieves as well as the other hygroscopic accelerating agent. The moisture in turn (1) displaces the basic compound in the molecular sieves and (2) acts in conjunction with the displaced base to accelerate the cure of the polymer composition. The term "accelerate" as used herein means to speed-up and/or initiate the cure of the curable composition of this invention.

As can be seen from the above description, one feature of this invention is the formation of a one-part stable curable polythiol composition by incorporating therein a molecular sieve loaded with a basic compound together with a non-molecular sieve hygroscopic agent which act together as hygroscopic, accelerating agents to produce an exceptionally short cure time when the composition is placed in a moisture containing environment. Another aspect of this invention is that in an environment which is protected from moisture, the base loaded molecular sieve and the non-molecular sieve hygroscopic agent act together as exceptionally good desiccating agents to give the composition very good package stability.

The polythiol polymers, upon which the compositions of this invention are based, are those polymers containing an average of at least two (—SH) groups per molecule and include, for example, and preferably the liquid polysulfide polymers. The (—SH) group containing polysulfide polymers upon which the compositions of this invention are based are organic polymeric materials which are liquid at room temperature and which contain recurring polysulfide linkages, i.e., $\pm S_n \pm$, in the polymeric backbone where $n$ is, on the average, about 1.5 to 5. These polymers include, for example, those liquid polythiopolymercaptan polymers as are disclosed, as noted above, in U.S. Patent 2,466,963 and which may be represented by the formula $HS(R—S—S)_nRSH$ where R is a hydrocarbon, oxahydrocarbon or thiahydrocarbon radical such as the ethyl formal radical (—CH$_2$—CH$_2$—O—CH$_2$—O—CH$_2$—CH$_2$—)

the butyl formal radical (—CH$_2$—CH$_2$—CH$_2$—CH$_2$—O—CH$_2$
—O—CH$_2$—CH$_2$—CH$_2$—CH$_2$—)

the ethyl ether radical (—CH$_2$—CH$_2$—O—CH$_2$—CH$_2$—)

and the butyl ether radical (—CH$_2$—CH$_2$—CH$_2$—CH$_2$—
O—CH$_2$—CH$_2$—CH$_2$—CH$_2$—)

and $n$ will vary from about 2 to 70, and preferably from about 4 to 23. These liquid polysulfide polymers have viscosities ranging from about 300 to about 150,000 centipoises at room temperature. Other (—SH) group containing polysulfide polymers are the (—SSH) terminated polymers such as those disclosed in copending application U.S. Ser. No. 290,637 filed June 26, 1963 now abandoned, in the name of E. R. Bertozzi and the blocked (—SSH) terminated polymers such as those disclosed in copending application U.S. Ser. No. 302,724, filed Aug. 16, 1963 now abandoned, in the name of E. R. Bertozzi.

Also useful as polythiol polymers in this invention are, for example, the thiol terminated polythiomethylene polymers such as described in U.S. Patents 3,056,841 and 3,070,580; the thiol terminated polyoxyalkylene glycol polymers such as described in U.S. Patent 3,258,495; the alkanepolythiol, aralkanepolythiol, and arenepolythiol polymers, such as disclosed in the above-mentioned U.S. Patents 2,230,390, 2,436,137, and 3,243,411; the polymeric polymercaptans formed by reacting a plurality of gem dithioether linkages with water in the presence of a catalytically effective amount of strong nonoxidizing acid such as disclosed in U.S. Ser. No. 484,105 filed Aug. 31, 1965, in the name of E. R. Bertozzi, and other polythiol polymers such as described in U.S. Ser. No. 484,118 filed Aug. 31, 1965 now abandoned in the names of G. F Bulbenko and L. Citarel; U.S. Ser. No. 484,097 filed Aug. 31, 1965 in the name of E. R. Bertozzi; and U.S. Ser. No. 484,122 filed Aug. 31, 1965 in the names of E.R. Bertozzi and M. B. Berenbaum.

Although certain of the polythiol polymer based compositions of this invention may be cured without the use of a curing agent, it is generally necessary and preferred that the compositions contain at least one moisture and base acceleratable oxidizing agent as a curing agent. These oxidizing agents are well known to those versed in the art of compounding curable, polythiol polymer based compositions. Examples of suitable oxidizing agents of this type are inorganic peroxides and dioxides such as alkali metal and alkaline earth metal peroxides and dioxides such as lithium peroxide, calcium peroxide, and barium peroxide; and other metal peroxides such as zinc peroxide, lead dioxide and manganese dioxide; inorganic oxides such as zinc oxide, lead oxide, calcium oxide, ferrous oxide, and ferric oxide; other oxidizing agents such as iodine or oxygen containing salts, e.g., the chromates, manganates, permanganates, and molybdates; the inorganic metal salt peroxides such as the alkali metal and alkaline earth metal salt peroxides; organic peroxides such as the peroxides, hydroperoxide and the like, e.g. benzoyl peroxide, dicumyl peroxide, and cumene hydroperoxide; and other organic oxidizing agents such as p-quinone dioxime, trinitrobenzene, dinitrobenzene, polyepoxide, polyisocyanates, organic titanates, organic borates, and organic silicates.

The most preferred curing agents are the metal peroxides such as calcium peroxide, zinc peroxide, barium peroxide, lithium peroxide and the like. The amount and type of particular curing agent which is used will, of course, depend upon the particular polythiol polymer being used, the amount and type of fillers used, the particular properties desired in the final cured composition, temperature during storage, temperature during cure, and like considerations known to the art.

The molecular sieves loaded with basic compound useful in the polythiol polymer based composition of this invention comprise a basic compound of the type which accelerates the cure of the curable polythiol polymer composition loaded in a molecular sieve. The molecular sieve inactivates the basic compound during the time the polymer based composition is in a moisture-free environment. Molecular sieves in this invention are those materials described generally as crystalline metal aluminosilicates which in the dehydrated form have a stable three-dimensional network of $SiO_4$ and $AlO_4$ tetrahedra providing intracrystalline voids which are interconnected by access openings or pores of uniform size. The electrovalence of the tetrahedra containing aluminum is balanced by the inclusion in the crystal of a cation, in particular, alkali metal or alkaline earth metal cations, especially sodium, potassium and calcium ions. The total void volume after dehydration is generally of the order of about 50%. These adsorbents are often referred to generally as zeolitic molecular sieves.

While there are a number of natural crystalline zeolites such as chabazite which have the above type of crystal structure and which may act as molecular sieves, most of these natural materials are unavailable in commercial quantities in sufficiently pure form, and in addition most have effective pore diameters which are too small for use in the invention. For this reason the synthetic zeolitic molecular sieves are much preferred for use in the present invention. These synthetic materials and their method of manufacture are described in detail in both publications and in the patent literature. See for example Hersh, Molecular Sieves, Reinhold Publishing Corporation (1961), chapters 5–7; Breck et al., J.A.C.S. vol. 78, pp. 5963–5977; and U.S. Patents 2,882,243 and 2,882,244.

The type of synthetic zeolitic molecular sieves described in U.S. Patents 2,882,243 and 2,882,244 are particularly suitable for use in the invention. Adsorbents of these types are commercially available e.g. from the Linde Division of Union Carbide Corporation under the designations e.g. Molecular Sieve Types 4A, 5A, 10X and 13X, having effective pore diameters of 4A, 5A, 10A and 13A respectively (A=angstrom units).

The basic compounds which are useful in this invention are ones which can be loaded on molecular sieves so as to remain in a dormant state, while the loaded molecular sieves are in moisture-free surroundings, but which upon contact with moisture, such as is present in the atmosphere, will be readily displaced and thereby activated by the moisture. Exemplary of such basic compounds are the amines such as diethylene triamine, ethylene diamine, n-butyl amine, triethanol amine, triethylene tetraamine, dibutyl amine, tri-(dimethylaminomethyl)phenol, and piperidine. The amount of basic compound used will depend upon the amount of curable polythiol polymer in the composition, the amount of curing agent present in the composition, and like factors. Generally, the amount of basic compound will vary from about 1 part to about 15 parts by weight per 100 parts by weight of the polythiol polymers. In addition, the molecular sieves may be loaded with basic compounds at different percent loadings. It is theoretically possible to obtain up to about 50 wt. percent (i.e. 50 parts of base to 50 parts of molecular sieve) loading of base on the molecular sieve (thus filling all of the cavities in the molecular sieves with basic compound); however, the preferred percent loading is from about 2 to about 20 percent by weight of molecular sieve present in the composition.

The non-molecular sieve hygroscopic, accelerating agent useful in this invention is preferably a desiccating agent. Examples of such hygroscopic activating agents are alkali metal and alkaline earth metal oxides, peroxides, hydroxides and salts of weak acids such as sodium oxide, sodium peroxide, potassium hydroxide, sodium acetate, sodium molybdate, potassium formate, calcium oxide, barium oxide, calcium peroxide, barium peroxide, calcium hydroxide and strontium hydroxide; other inorganic salts such as ferric chloride, and sodium phosphate; polar organic solvents such as polyethylene glycol dibenzoate, the formal of the n-butyl monoether of diethylene glycol sold under the trademark butyl Carbitol formal, the adipate of the n-butyl monoether of diethylene glycol sold under the trademark butyl Carbitol formal, triphenyl phosphite, and combinations thereof. The polar hygroscopic organic solvents are particularly preferred because they serve also as a plasticizer and can be used in sizable amounts without detrimentally affecting the end properties of the cured composition of this invention. It should be noted that certain curing agents may also serve the dual function of a hygroscopic accelerating agent.

The curable polythiol polymer based compositions and the primer compositions of the present invention may also contain various types of inert materials commonly employed in sealant and caulking compositions including adhesive additives such as phenolic and epoxy resins and organosilica compounds; fillers; plasticizers; pigments; ultraviolet light stabilizers and cure inhibitors such as stearic acid. Preferably the curable composition is kept at a pH of from about neutral to slightly basic during the period of storage in a moisture-free environment by the use of suitable basic materials which are not used in a molecular sieve. However, the pH of the particular composition may be increased or decreased to achieve the desired balance between "package stability" and "cure rate." In general, increasing the basicity of the curable composition shortens both the package stability and the cure time of the particular curable composition involved.

Because of the presence of desiccating materials in the polymer composition of this invention, it is not necessary that the ingredients be completely moisture free; however, the preferred polymer composition is one which is substantially anhydrous, e.g. contains less than 0.3% by weight of moisture, since such a composition has the best package stability. Moreover, uniformity of product is more readily achieved by means of such an anhydrous composition.

The relative amounts of base loaded zeolitic molecular sieve; desiccating, hygroscopic accelerating agent; curing agent; and/or other ingredients admixed with the polythiol polymer may be varied substantially depending upon the molecular weight and/or chemical structure of the polymer; the relative freedom from moisture of the entire composition; the desired end use of the composition, and other factors known to the art. Generally, however, it is desirable that the curing agent be present in at least stoichiometric amounts in order to provide complete cure of the polymer composition. Furthermore, the amount of desiccating, deliquescent accelerating agent should be sufficient to provide a rapid cure upon exposure to moisture, such as moisture in the air. The amount of base loaded zeolitic molecular sieve may be varied over wide ranges but will generally be in sufficient amounts to provide a composition having prolonged package stability under moisture-free conditions, but not with such large amounts as to substantially delay the rate of cure upon exposure of the polysulfide polymer composition to moisture. For example, where 100 parts by weight of polymer is used having a molecular weight of about 4000, the amount of curing agent will range from about 2 to 20 parts by weight, the amount of desiccating, hygroscopic accelerating agent will range from about 0.5 to 50 parts by weight, and the amount of base loaded zeolitic molecular sieve will range from about 0.5 to 50 parts by weight.

The following examples are merely illustrative of the present invention and are not intended as a limitation upon the scope thereof.

Example 1

A one-part polythiol polymer based composition was prepared having the following compositions:

| | Parts by weight |
|---|---|
| Polymer [1] | 100 |
| Calcium carbonate (filler) | 60 |
| Polyethylene glycol dibenzoate (hygroscopic plasticizer) | 25 |
| Zinc peroxide | 10 |

[1] Polysulfide polymer having a molecular weight of about 4000, a viscosity of about 40,000 centipoises, about 0.5% crosslinking, and essentially the structure
$HS(C_2H_4-O-CH_2-O-C_2H_4-SS)_{23}C_2H_4-O-CH_2-O-C_2H_4-SH$ The ingredients were thoroughly mixed in a vacuum mixer and then placed in air-tight lead-lined tooth-paste-type tubes with screw caps. The thus filled tubes were stored at 75° F., 105° F., 130° F., and 158° F. Periodically some of the material is extruded from each of the tubes. A material is considered to have lost its package stability when the material is no longer extrudable.

Package stability in days was as follows:

Stored at:
   75° F. _____days__ 53+

Immediately after mixing the ingredients the composition thus formed is applied to test panels to form beads approximately ⅜ inch deep and ⅜ inch wide and tested for various degrees of cure as follows:

Tack-free time (days)

|   | Minus |
|---|---|
| Exposed at 30% RH (relative humidity at a temperature of about 75° F.) | 12 |
| 50% RH | 10 |

Time to develop thick skin (days)

| Exposed at 30% RH | 15 |
|---|---|
| 50% RH | 14 |

Complete cure time (days)

| Exposed at 30% RH | 53+ |
|---|---|
| 50% RH | 44 |

"Tack-free time" is the time required for the surface of beads of this composition to lose tack or stickiness until particles of dust or lint will not stick to the bead surface. "Time to develop thick skin" is the time which it takes the exposed bead to form a cured, elastomeric skin of approximately 20 mils in thickness. "Complete cure time" is the time it takes for the bead to become elastomeric throughout the entire mass.

EXAMPLES 2–5

A dehydrated zeolite material (5A molecular sieve) containing about 10% by weight of diethylene triamine was added to the one-part composition of Example 1 in order to formulate four one-part compositions having varying proportions of amine containing molecular sieves.

These compositions when tested as in Example 1 gave the following results as compared to the results of Example 1.

| Example No | 1 | 2 | 3 | 4 | 5 |
|---|---|---|---|---|---|
| Amine Sieve Conc. (parts per 100 parts by weight of polymer) | 0 | 0.5 | 1 | 2 | 5 |
| Package Stability (days),[1] Stored at: 75° F | 53+ | 53+ | 46 | 53+ | 53+ |
| Tack-Free Time (days), Exposed: | | | | | |
| 30% RH | 12 | 5 | 4 | 1 | 1 |
| 50% RH | 10 | 1 | 1 | 1 | 1 |
| Time to Develope Thick Skin (days), Exposed: | | | | | |
| 30% RH | 15 | 6 | 5 | 3 | 1 |
| 50% RH | 14 | 3 | 1 | 1 | 1 |
| Complete Cure Time (days),[2] Exposed: | | | | | |
| 30% RH | 53+ | 13 | 7 | 7 | 8 |
| 50% RH | 44 | 12 | 6 | 3 | 6 |

[1] Plus sign (+) indicates that the compound was still stable at the time of making the last observation.
[2] Plus sign (+) indicates that the compound was not fully cured at time reported here.

The comparison of the test results obtained with the composition of Example 1 with the results obtained with the compositions of Examples 2–5 shows that the addition of a base loaded molecular sieve to the one-part curable polythiol composition of Example 1 containing a hydroscopic plasticizer has the effect of markedly shortening the complete cure time without substantially changing the package stability of the composition.

EXAMPLES 6–12

One part compositions were prepared and tested according to the procedures of Example 1.

| Example No | 6 | 7 | 8 | 9 | 10 | 11 | 12 |
|---|---|---|---|---|---|---|---|
| Polymer of Example 1 | 100 | 100 | 100 | 100 | 100 | 100 | 100 |
| Calcium carbonate | 60 | 60 | 60 | 60 | 60 | 60 | 60 |
| Polyethylene glycol dibenzoate (hygroscopic plasticizer) | 25 | 25 | 25 | 25 | 25 | 25 | 25 |
| Polyepoxide [1] | 7 | 7 | 7 | 7 | 7 | 7 | 7 |
| Amine Sieve [2] | 10 | 10 | 10 | 10 | 2 | | |
| Do.[3] | | | | | | 2 | |
| Do.[4] | | | | | | | 2 |
| Calcium Iodide (hygroscopic salt) | | | | 2 | | | |
| Zinc Chloride (hygroscopic salt) | 2 | | | | 2 | | |
| Lithium Peroxide (curing agent) | 10 | | | | | | |
| Zinc Peroxide (curing agent) | | 10 | 10 | 10 | 10 | 10 | 10 |
| Package Stability (days),[5] Stored at: 75° F | 15 | 35+ | 35+ | 35+ | 43+ | 43+ | 43+ |
| Tack-Free Time (days), Exposed: 30% RH | 1 | 1 | 1 | 1 | 1 | 1 | 3 |
| Complete Cure Time (days) Exposed: 30% RH | 5 | 7 | 5 | 9 | 5 | 4 | 14 |

[1] An essentially anhydrous solution of solid polyepoxide in a solvent mixture of methyl isobutyl ketone and toluene. The solid polyepoxide is sold under the name Epon 1007 and has a melting point range of 125–135° C. and an epoxide equivalent value of 2,000–2,500.
[2] 5A molecular sieve loaded with 10 wt. percent ethylene diamine.
[3] 13X molecular sieve loaded with 10 wt. percent ethylene diamine.
[4] 13X molecular sieve loaded with 10 wt. percent n-butyl amine.
[5] Plus sign (+) indicates compound was stable when checked.

Examples 6–12 show that the curable polythiol based compositions of these examples containing a base loaded molecular sieve, at least one hydroscopic agent, and polyepoxide have relatively good "package stability" combined with very short "complete cure time."

EXAMPLES 13–15

One-part compositions were prepared by thoroughly mixing on a paint mill the ingredients outlined below. The compositions were then tested by the procedures of Example 1.

| Ingredients (Parts by Weight) | 13 | 14 | 15 |
|---|---|---|---|
| Polysulfide polymer of Example 1 | 100 | 100 | 100 |
| Titanium dioxide (Filler) | 45 | 45 | 45 |
| Barium peroxide | 8 | 8 | 8 |
| Polyepoxide [1] | 8 | 8 | 8 |
| Potassium Formate (hygroscopic salt) | 0.05 | 0.05 | 0.05 |
| 5A Molecular Sieve (unloaded) | | 4 | |
| Amine Sieve [2] | | | 5 |
| Package Stability (days),[3] Stored at: 75° F | 123+ | 123+ | 123+ |
| Tack-Free Time (days), Exposed: 30% RH | 2 | 2 | 1 |
| Complete Cure Time (days), Exposed: 30% RH | 38 | 38 | 21 |

[1] An essentially anhydrous solution of solid polyepoxide in a solvent mixture of methyl isobutyl ketone and toluene. The solid polyepoxide is sold under the name Epon 1007 and has a melting point range of 125–135° C. and an epoxide equivalent value of 2,000–2,500.
[2] Anhydrous molecular sieve containing about 20% of diethylene triamine.
[3] Plus sign (+) indicates composition was package stable when checked.

Examples 13–15 show that the "complete cure time" of the curable polythiol based composition of Example 13 containing a hygroscopic agent is not affected by the addition of an unloaded molecular sieve, whereas the "complete cure time" is significantly shortened by addition of amine loaded molecular sieve to the same composition.

From the above it is evident that this invention relates to a curable one-part polythiol composition which is protected from moisture and capable of being shipped and stored in a single container and later being deposited in place without agitation or intermixing with other material for complete curing by contact of its surface with surroundings containing essentially only moisture.

I claim:

1. A stable, unitary liquid polymer composition protected from moisture and capable of being shipped and stored in a single container and later being deposited in place without agitation or intermixing with other material for complete curing by contact of its surface with surroundings containing essentially only moisture, comprising essentially
    (a) a normally liquid polythiol polymer containing at least two terminal mercaptan groups per polymer molecule and capable of undergoing further polymerization, under oxidative reaction conditions, to form a normally solid polymer containing recurring disulfide groups derived from oxidative coupling of the mercaptan groups;
    (b) a dormant oxidizing agent in an amount sufficient to cure the liquid polythiol polymer;
    (c) a hygroscopic agent adapted and sufficient to maintain the polymer composition in dry condition during shipment and storage and to absorb moisture from its surroundings after deposition in place; and
    (d) an amine-loaded molecular sieve adapted to remain dormant in the absence of moisture and to undergo displacement of the adsorbed amine when the polymer composition is exposed to moisture.

2. The polymer composition according to claim 1, in which the normally liquid polythiol polymer is a polythiopolymercaptan polymer represented by the formula $$HS(R-S-S)_n RSH$$

in which R represents a divalent substituent selected from the group consisting of hydrocarbon, oxahydrocarbon or thiahydrocarbon groups, and $n$ is an integer in the range from about 2 to 70.

3. The polymer composition according to claim 1, in which the normally liquid polythiol polymer is a mercaptan-terminated polythiomethylene polymer.

4. The polymer composition according to claim 1, in which the normally liquid polythiol polymer is a mercaptan-terminated polyoxyalkylene glycol polymer.

5. The polymer composition according to claim 1, in which the amine contained in the amine-loaded molecular sieve is selected from the group consisting of diethylene triamine, ethylene diamine, n-butyl amine, triethanol amine, triethylene tetramine, dibutyl amine, tri(dimethylaminomethyl)phenol, and piperidine.

6. The polymer composition according to claim 1, in which the oxidizing agent is selected from the group consisting of alkali metal and alkaline earth metal peroxides and dioxides, lead peroxide, zinc peroxide, and manganese dioxide.

7. A stable, unitary, liquid polymer composition protected from moisture and capable of being shipped and stored in a single container and later being deposited in place without agitation and intermixing with other material for complete curing by contact of its surface with surroundings containing essentially only moisture, comprising essentially (a) a normally liquid polythiopolymercaptan polymer represented by the formula $$HS(R-S-S)_nRSH$$

in which R represents a divalent substituent selected from the group consisting of hydrocarbon, oxahydrocarbon, and thiahydrocarbon groups, and $n$ is an integer from about 2 to 70;

(b) a dormant oxidizing agent in an amount sufficient to cure the polythiopolymercaptan polymer, the dormant oxidizing agent being selected from the group consisting of alkali metal and alkaline earth metal peroxides and dioxides, lead peroxide, zinc peroxide, and manganese dioxide;

(c) a hygroscopic agent adapted and sufficient to maintain the polymer composition in dry condition during shipment and storage and to absorb moisture from its surroundings after deposition in place; and (d) an amine-loaded molecular sieve adapted to remain dormant in the absence of moisture and to undergo displacement of the adsorbed amine when the polymer composition is exposed to moisture, the adsorbed amine being selected from the group consisting of diethylene triamine, ethylene diamine, n-butyl amine, triethanol amine, triethylene tetramine, dibutyl amine, tri-(dimethylaminomethyl)phenol, and piperidine.

8. The polymer composition according to claim 7, in which the dormant oxidizing agent is calcium peroxide.

9. The polymer composition according to claim 7, in which the dormant oxidizing agent is zinc peroxide.

10. The polymer composition according to claim 7, in which the dormant oxidizing agent is lithium peroxide.

11. The polymer composition according to claim 7, in which the dormant curing agent is barium peroxide.

12. The polymer composition according to claim 7, in which the dormant curing agent is manganese dioxide.

13. The polymer composition according to claim 7, in which the hygroscopic agent is a polar organic solvent selected from the group consisting of polyethylene glycol dibenzoate, the formal of the n-butyl monoether of diethylene glycol, the adipate of the n-butyl monoether of diethylene glycol, and triphenyl phosphite.

References Cited
UNITED STATES PATENTS

| | | | |
|---|---|---|---|
| 2,875,168 | 2/1959 | Smith et al. | 260—31.6 |
| 2,910,922 | 11/1959 | Horning | 260—79.1 |
| 2,940,958 | 6/1960 | Smith | 260—79.1 |
| 3,215,677 | 11/1965 | LeFave et al. | 260—79.1 |
| 3,225,017 | 12/1965 | Seegman et al. | 260—79.1 |
| 3,245,946 | 4/1966 | O'Connor et al. | 260—2 |
| 3,282,902 | 11/1966 | Panek | 260—79.1 |
| 3,331,782 | 7/1967 | Deltieure | 260—79.1 |
| 3,056,817 | 10/1962 | Werber et al. | 260—31.6 |

DONALD E. CZAJA, *Primary Examiner.*

M. I. MARQUIS, *Assistant Examiner.*